United States Patent [19]

Ebersole et al.

[11] Patent Number: 5,041,963
[45] Date of Patent: Aug. 20, 1991

[54] LOCAL AREA NETWORK WITH AN ACTIVE STAR TOPOLOGY COMPRISING RING CONTROLLERS HAVING RING MONITOR LOGIC FUNCTION

[75] Inventors: Ronald J. Ebersole, Beaverton; Frederick J. Pollack, Portland, both of Oreg.

[73] Assignee: Intel Corporation, Santa Clara, Calif.

[21] Appl. No.: 291,700

[22] Filed: Dec. 29, 1988

[51] Int. Cl.[5] .................... G06F 15/16; G06F 11/30; G06F 13/36; G06F 13/00
[52] U.S. Cl. .................... 364/200; 364/221.6; 364/221.7; 364/229.3; 364/230; 364/240; 364/240.7; 364/241.1; 364/241.8; 364/242; 364/242.95; 370/60; 370/94.1
[58] Field of Search ............... 364/200, 900; 370/85, 370/86, 60, 94.1

[56] References Cited

U.S. PATENT DOCUMENTS

| 4,334,305 | 6/1982 | Girardi | 370/86 |
|---|---|---|---|
| 4,482,980 | 11/1984 | Korowitz et al. | 364/900 |
| 4,489,379 | 12/1984 | Lanier et al. | 364/200 |
| 4,493,021 | 1/1985 | Agrawal et al. | 364/200 |
| 4,539,655 | 9/1985 | Trussell et al. | 364/900 |
| 4,754,395 | 6/1988 | Weisshaar et al. | 364/200 |
| 4,771,391 | 9/1988 | Blasbalg | 364/200 |
| 4,777,591 | 10/1988 | Chang et al. | 364/200 |
| 4,835,673 | 5/1989 | Rushby et al. | 364/200 |
| 4,888,726 | 12/1989 | Struger et al. | 364/900 |

Primary Examiner—Stuart N. Hecker
Assistant Examiner—George C. Pappas
Attorney, Agent, or Firm—Owen L. Lamb

[57] ABSTRACT

A star local area network includes a ring bus hub (4) capable of being connected to a plurality of nodes (3, 5, 9) geographically distant from the hub by means of low speed serial links (18, 19, 21, 28). The nodes include processor means (2, 30, 31) for creating messages for transfer on the network. A plurality of duplex communication links (18, 19, 21, 28) connect the nodes to the ring bus hub (4). The hub (40) is comprised of a plurality of ring controllers (10, 12, 14, 16) driven by a common clock source (7). Each ring controller is connected by means of a number of parallel lines to other ring controllers in series to form a closed ring. Each one (3) of the plurality of nodes is geographically distant from the hub (4) and is connected to a corresponding one (10) of the ring controllers by means of one (18, 19) of the duplex communication links. The node controllers including node interface means (40) for transmitting the messages as a contiguous stream of words on the duplex communication link. The ring controllers include ring bus interface means (42) for forming the messages into discrete data packets for insertion onto the ring bus and means (32, 34) for buffering data messages received form the node and over the ring bus.

10 Claims, 2 Drawing Sheets

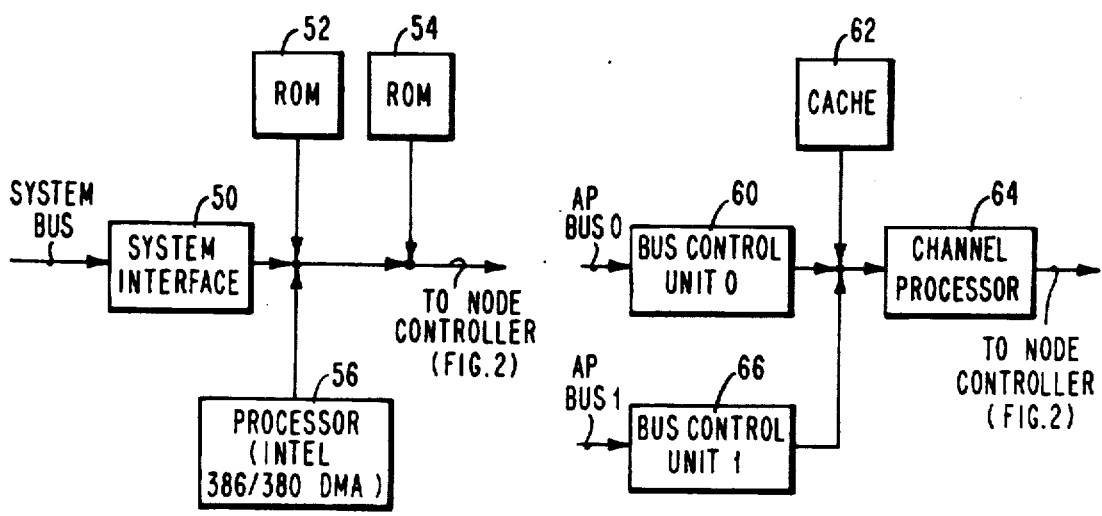
FIG.3          FIG.4
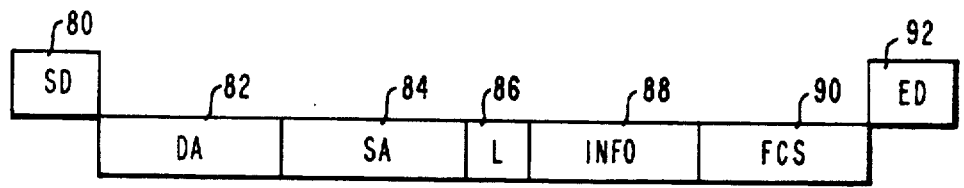
FIG.5   MESSAGE FORMAT
FIG.6a   IEEE 802.3 STANDARD INDIVIDUAL MESSAGE FORMAT
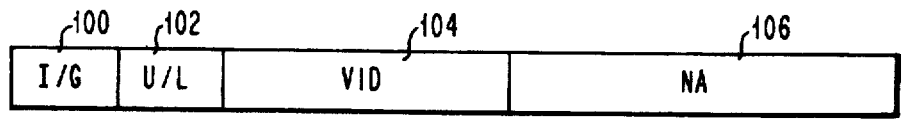
FIG.6b   IEEE 802.3 STANDARD GROUP MESSAGE FORMAT
FIG.7a   INDIVIDUAL LOCAL ADDRESS FORMAT
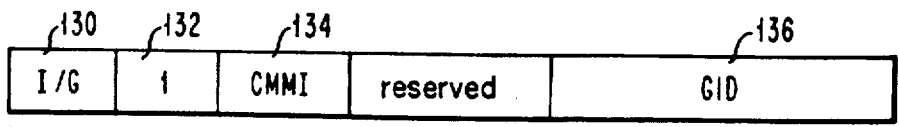
FIG.7b   GROUP LOCAL ADDRESS FORMAT

LOCAL AREA NETWORK WITH AN ACTIVE STAR TOPOLOGY COMPRISING RING CONTROLLERS HAVING RING MONITOR LOGIC FUNCTION

CROSS REFERENCES TO RELATED APPLICATIONS

This application is related to U.S. Pat. No. 4,939,724, granted on July 3, 1990 "Cluster Link Interface⇌ of Ronald Ebersole, "Ring Bus Hub for a Star Local Area Net-work" Ser. No. 07/291,756 of Ronald Ebersole now abandoned and "Node Controller for a Local Area Network" Ser. No. 07/291,640 now abandoned of Ronald Ebersole, all filed concurrently herewith and assigned to Intel Corporation.

BACKGROUND OF THE INVENTION

1. Field of the Invention

The invention relates to data processing systems and more particularly to a method and apparatus for interconnecting a plurality of computer workstations with I/O devices and other workstations which allows the users to share I/O resources.

2. Description of the Related Art

A Local Area Network, or LAN, is a data communications system which allows a number of independent devices to communicate with each other within a moderately-sized geographical area. The term LAN is used to describe networks in which most of the processing tasks are performed by a workstation such as a personal computer rather than by a shared resource such as a main frame computer system.

With the advent of the inexpensive personal computer workstation, LANs equipped with various kinds of desktop computers are beginning to replace centralized main frame computer installations. The economic advantage of a LAN is that it permits a number of users to share the expensive resources, such as disk storage or laser printers, that are only needed occasionally.

In a typical LAN network a desktop workstation performs processing tasks and serves as the user's interface to the network. A wiring system connects the workstations together, and a software operating system handles the execution of tasks on the network. In addition to the workstations, the LAN is usually connected to a number of devices which are shared among the workstations, such as printers and diskstorage devices. The entire system may also be connected to a larger computer to which users may occasionally need access. Personal computers are the most popular desktop workstations used with LANs.

The configuration of the various pieces of the network is referred to as the topology. In a star topology a switching controller is located at the center or hub of the network with all of the attached devices, the individual workstations, shared peripherals, and storage devices, on individual links directly connected to the central controller. In the star configuration, all of these devices communicate with each other through the central controller which receives signals and transmits them out to their appropriate destinations.

A second kind of topology is the bus topology. In this topology, wiring connects all of the devices on the LAN to a common bus with the communications signal sent from one end of the bus to the other. Each signal has an address associated with it which identifies the particular device that is to be communicated with. Each device recognizes only its address.

The third topology employs a circular bus route known as a ring. In a ring configuration, signals pass around the ring to which the devices are attached.

Both bus and ring networks are flexible in that new devices can be easily added and taken away. But because the signal is passed from end to end on the bus, the length of the network cable is limited. Star topologies have the advantage that the workstations can be placed at a considerable distance from the central controller at the center of the star. A drawback is that star topologies tend to be much slower than bus topologies because the central controller must intervene in every transmission.

In a star configuration, the signaling method is different than in bus or ring configurations. In the star configuration the processor central controller processes all of the communication signals. In a bus topology there is no central controller. Each device attempts to send signals and enter onto the bus when it needs to. If some other device trys to enter at the same time, contention occurs. To avoid interference between two competing signals, bus networks have signaling protocols that allow access to the bus by only one device at a time. The more traffic a network has, the more likely a contention will occur. Consequently, the performance of a bus network is degraded if it is overloaded with messages.

Ring bus configurations have even more complex signaling protocols. The most widely accepted method in ring networks is known as the token ring, a standard used by IBM. An electronic signal, called a token, is passed around the circuit collecting and giving out message signals to the addressed devices on the ring. There is no contention between devices for access to the bus because a device does not signal to gain access to the ring bus; it waits to be polled by the token. The advantage is that heavy traffic does not slow down the network. However, it is possible that the token can be lost or it may become garbled or disabled by failure of a device on the network to pass the token on.

The physical line which connects the components of a LAN is called the network medium. The most commonly used media are wire, cable, and fiber optics. Coaxial cable is the traditional LAN medium and is used by Ethernet TM, the most widely recognized standard. The newest LAN transmission medium is fiber-optic cable which exhibits a superior performance over any of the other media.

The Fiber Distributed Data Interface (FDDI) is another standard. FDDI is a token-ring-implementation fiber media that provides a 100 m-bit/second data rate.

There is an increasing need for high-performance-internode communication, that is broader I/O bandwidth. The mainframe computer is being extended or replaced by department computers, workstations, and file servers. This decentralization of computers increases the amount of information that needs to be transferred between computers on a LAN. As computers get faster, they handle data at higher and higher rates. The Ethernet TM standard is adequate for connecting 20–30 nodes, each with a performance in the range of 1 to 5 mips. Ethernet TM is inadequate when the performance of these nodes ranges from 5 to 50 mips.

An I/O connectivity problem also exists that concerns I/O fanout and I/O bandwidth. The bandwidth problem was discussed above with respect to internode communication. The I/O fanout problem is related to the fact that central processing systems are getting smaller and faster. As the computing speed increases, the system is capable of handling more and more I/O. However, as the systems get smaller, it becomes harder to physically connect the I/O to the processors and memory. Even when enough I/O can be configured in the system, the I/O connectivity cost can be prohibitive. The reason is that the core system (processors and memory) must be optimized for high-speed processors and memory interconnect. The cost of each high-speed I/O connection to the core is relatively expensive. Thus, cost-effective I/O requires that the connection cost be spread over several I/O devices. On mainframe computers, the solution to the connectivity problem is solved by using a channel processor. A channel processor is a sub-processor that controls the transfer of data between several I/O devices at a time by executing channel instructions supplied by the main processor. The main processor system is connected to several of these channel processors. Several channels can share one core connection.

It is therefore an object of the present invention to provide an improved LAN that allows high performance interdevice communication and has the ability to connect a number of I/O devices to the network.

SUMMARY OF THE INVENTION

The above object is accomplished in accordance with the present invention by providing a LAN which combines the advantages of a star LAN with a ring bus LAN. The star configuration provides links to nodes at the relatively slow bandwith of the node link. The hub of the star uses the relatively high bandwidth of a ring bus.

Nodes attach to the hub of the star through duplex communication links. Messages transferred between nodes are passed through the hub, which is responsible for arbitration and routing of messages. Unlike the prior bus topology, or ring topology, each node of the active star responds only to those messages that are intended for it. Routing of messages is accomplished by a destination address in the header of the message. These addresses are unique to each node and provide the means by which the hub keeps the communication between nodes independent.

The active star configuration of the present invention has the advantage that it increases network bandwidth. In typical networks the performance of the node's means of attachment to the network is equivalent to the network bandwidth. This is because messages can be transferred only at the rate of the media, and only one message can be transferred at a time. Ethernet, Star Lan, FDDI, all exhibit this characteristic as they are essentially broadcast buses, in which every node sees every other node's traffic.

In the active star configuration of the present invention, every data communication is an independent communication between two nodes. Simultaneous, independent communication paths between pairs of nodes can be established at the same time. Each path can handle data transfers at the link media transmission speed, providing a substantial increase in the total network bandwidths. When two nodes want to communicate with the same destination, the hub arbitrates between them and buffers the message from the node that is locked out.

An addressing mechanism maintains a consistent address environment across the complete network that facilitates routing. Each node address is composed of two fields, one field providing a node address relative to the hub it is attached to, and the other field, a hub address relative to the other hubs in the network. The combination of these two fields is a unique network address that is used to route any message to its ultimate destination.

The foregoing and other objects, features, and advantages of the invention will be apparent from the following more particular description of a preferred embodiment of the invention as illustrated in the accompanying drawings.

BRIEF DESCRIPTION OF THE DRAWINGS

FIG. 3 is a diagram of a micro based subsystem;

FIG. 4 is a block diagram of a cluster I/O subsystem;

FIG. 5 illustrates the message format;

FIGS. 6a and 6b illustrates the IEEE 802.3 standard message format; and,

FIGS. 7a and 7b show the structure of the Local address field for a native Cluster node address.

DESCRIPTION OF THE PREFERRED EMBODIMENT

Figure 1:
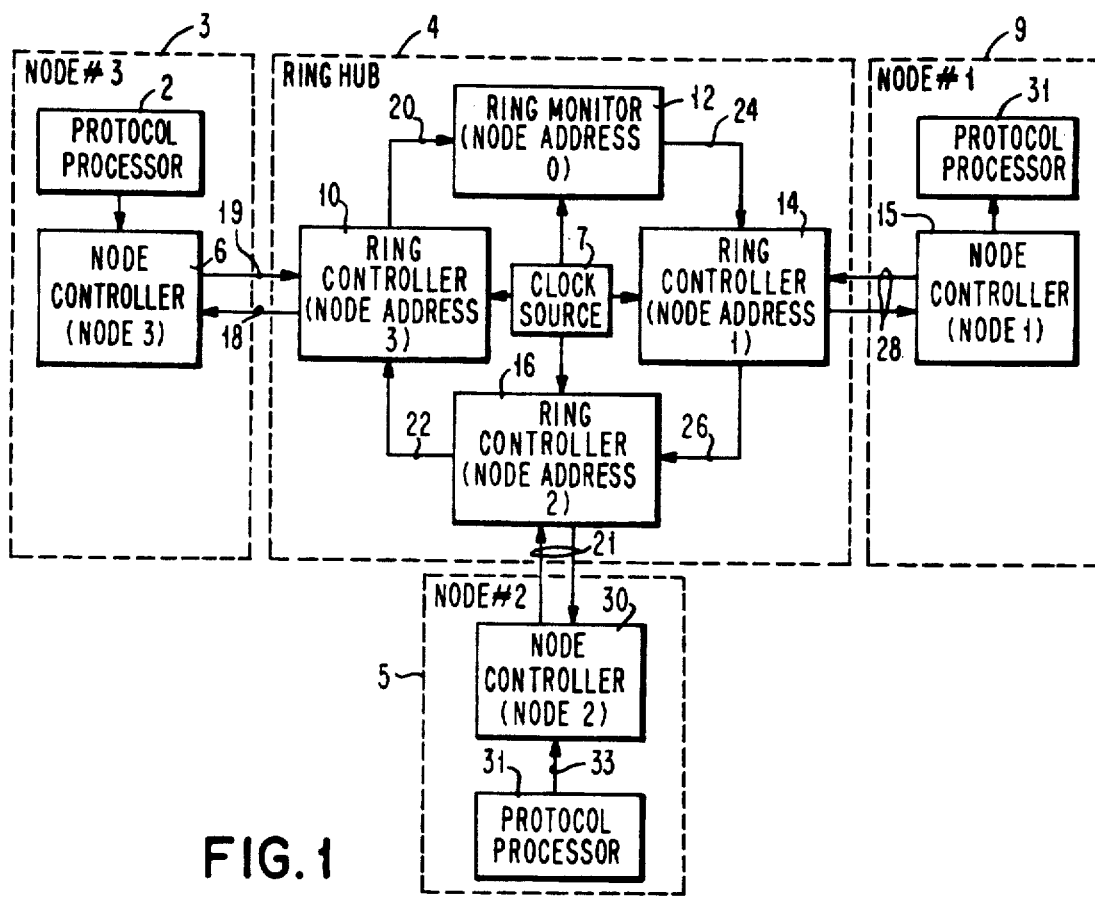
FIG. 1 is a functional block diagram of the Local Area Network of the present invention.

The interconnect architecture shown in FIG. 1 is designed to transfer blocks of data, called messages, between nodes attached to it. The interconnect function is implemented in a single VLSI component known as the Cluster Interface Controller (CLIC), shown in FIG. 2. The transfer of messages between nodes attached to the Cluster is controlled by a protocol running in each of the nodes, which maintains the orderly access and use of the network.

The present application defines the Cluster architecture. The CLIC component is described in application Ser. No. 07/291,640. The link between the node controller and the ring controller is more fully described in U.S. Pat. No. 4,939,724.

The LAN architecture is based on an active star topology, as illustrated in FIG. 1. Nodes attach to the hub (4) of the star through duplex communication links. Messages transferred between nodes all pass through the hub, which is responsible for arbitration and routing of messages. Unlike Ethernet TM or token rings, each node sees only those messages that are intended for it. Routing of messages is determined by a destination address in the header of the message. These addresses are unique to each node and provide the means for the hub to keep the communication between nodes independent.

The active star configuration increases network bandwidth. In typical networks, the performance of the node's attachment to the network is equivalent to the network bandwidth. This is because messages can be transferred only at the rate of the media, and only one can be transferred at a time. Ethernet TM, Starlan TM, FDDI, etc. all exhibit this characteristic as they are essentially broadcast buses, in which every node sees every other node's traffic.

Hub-to-hub connectivity extends the capability of the network, providing for a much wider variety of configurations. The network addressing mechanism maintains a consistent address environment across the complete network that facillitates routing. Each node address is composed of two fields, one providing a node address relative to the hub it is attached to and the other a hub address relative to the other hubs in the network. The combination is a unique network address, that is used to route any message to its ultimate destination.

A network is composed of only a few functional modules, as illustrated in FIG. 1. The interconnect functionality is contained in the Node controllers (6, 30) and Ring Controllers (10, 12, 14, 16), which are two separate personalities of one VLSI chip selected by a mode pin input to the CLIC component shown in FIG. 2. A significant amount of common logic exists in the CLIC for buffering and connecting to the media interface. The CLIC will be referred to as either a Node Controller or Ring Controller, depending on its function in the network.

Media interfaces provide a method of connecting the CLIC to different link media, such as twisted pair wires, coax cable, or fiberoptic cable. Media interfaces typically consist of an interface component or components designed for an existing network. For example, the combination of the 82501 Ethernet TM manchester encoder-decoder component and a differential driver/receiver allow interfacing to twisted pair wires.

The hub (4) is a "register insertion ring". The network uses the ring bus described in Ser. No. 07/291,756 at the hub for arbitration and routing of messages. The hub is composed of the Ring Controllers (10, 12, 14, 16) and their media interfaces (18, 19, 21, 28). Every node controller has a corresponding Ring Controller attached via the media interfaces and the link between them. The ring controllers are connected as a unidirectional ring bus that closes on itself.

The node is composed of the protocol processor (2), Node Controller (6), and media interface (18, 19). Although the protocol processor is not part of the present invention, it is shown to illustrate how a workstation is interfaced to a node controller. The protocol processor is responsible for supplying messages (to be sent on the network from the node) to the node controller (6), and removing messages received by the node controller from the network. Protocol handlers running on the protocol processor control the flow of messages between the node and other nodes on the network. The network hub is responsible for actual transfer of the message to its destination.

CLUSTER INTERFACE CONTROLLER (CLIC)

Figure 2:
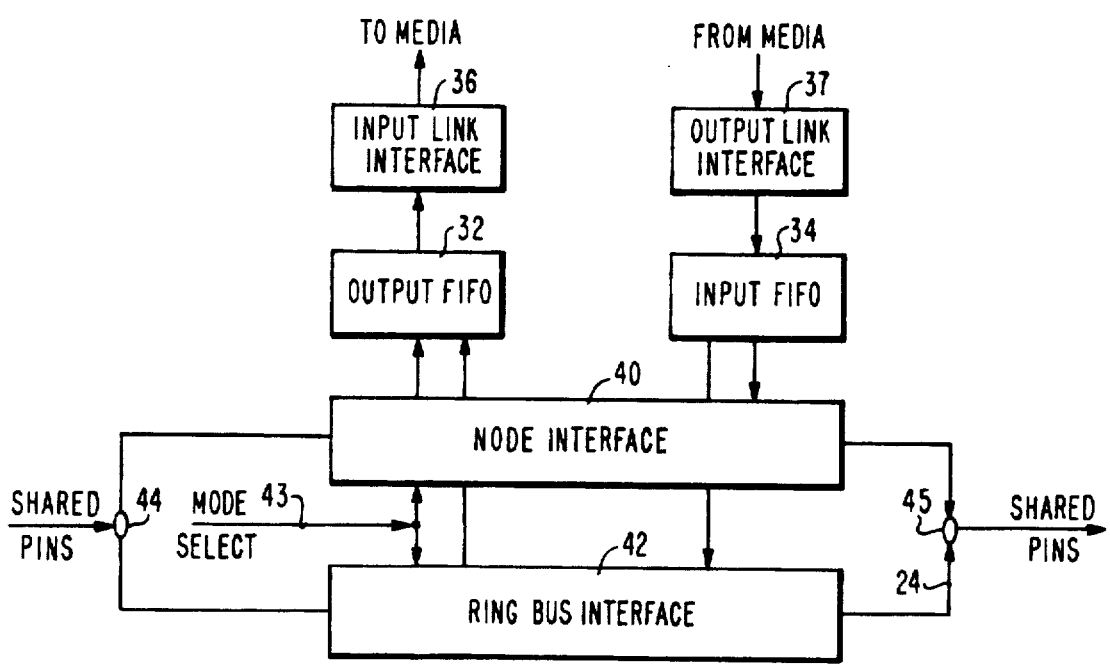
FIG. 2 is a functional block diagram of the interface controller shown in FIG. 1 used in one mode of operation as a node controller and in another mode of operation as a ring controller.

The CLIC provides both the node and hub interface capabilities of the Cluster. FIG. 2 illustrates the three major functional blocks of the CLIC and how they are related. The link interface (36, 37) is common to both the node and Ring Controller functions of the component. When used in a network, either the node interface (40) or ring bus interface (42) is selected (43), allowing the selected interface access to the link interface (36, 37) and the I/O pins (44, 45) of the combined node/ring bus interface.

NETWORK ADDRESSING

The IEEE 802.3 Standard message format and address model are used in the Cluster. The Cluster provides a link interface mode that allows a node implemented in accordance with the IEEE 802.3 standard to connect directly to the Cluster without a gateway or bridge. The adaption to the Cluster architecture is provided by the Ring Controller (CLIC) component.

MESSAGE FORMAT

The message format is illustrated in FIG. 5. Starting (80) and ending (92) delimiters are shown separately to illustrate the dependency on the actual link between the node and the hub. Framing bits are a function of the link and are removed/regenerated every time a message crosses a link boundary. The fields are defined as follows:

SD : Starting Delimiter (Link Dependent)
DA : Destination Address (6 bytes)
SA : Source Address (6 bytes)
L : Length (2 bytes)
INFO : Information (Up to 4.5 K bytes)
FCS : Frame Check Sequence (4 bytes)
ED : Ending Delimiter (Link Dependent)

ADDRESS FIELDS

The source address (SA) and destination address (DA) fields are 48-bits in length and have identical formats. The source address (84) identifies the node originating the message. The destination address identifies the node receiving the message. The IEEE 802.3 standard defines two address lengths, 16-bit and 48-bit. Only the 48-bit length is used in the Cluster. The IEEE 802.3 address format is shown in FIG. 6a and 6b. The fields are defined as follows. For FIG. 6a:

I/G : Individual (|0) or Group (|1) Address
U/L : Locally Administered Address (|1)
ADDR|Station Address (46 bits)

For FIG. 6b:

I/G : Individual (|0) or Group (|1) Address
U/L : Universal Address (|0)
VID|Vendors Identification (22 bits)
NA|Node Address (24 bits, assigned by Vendor)

The I/G bit (94, 100) identifies the address as an individual or group address. Individual addresses are to a single node. Group can be to a subset of the total set of nodes on the network or all nodes (broadcast). Broadcast is defined as all address bits equal to 1. Individual and group addresses (other than broadcast) are further qualified by the U/L bit (96, 102). Universal addresses are unique addresses administered by the IEEE. Each manufacturer of 802.3 nodes, or controllers, receives a vendor identification number from the IEEE. That manufacturer will then assign 24 bit node addresses to each product in sequence. The combination of vendor ID and node ID creates a unique, universal ID that can be used on any network.

Locally administered addresses are defined within a single network and are independent. They allow special functions, grouping, etc. Cluster provides for both Local and Universal addresses. Native Cluster addresses are encoded in the Local address and have an architecturally defined structure. The structure facillitates efficient routing between interconnected hubs. Nodes interfacing to a Cluster network through a Node Controller (CLIC) are identified only by Local addresses.

Universal addresses are supported to allow attachment of 802.3 nodes without altering their software or hardware. The intent is to provide a migration path and performance increase to existing nodes with no changes.

LENGTH FIELD

The length field (L) is two bytes or 16-bits in length. It's value indicates the length, in number of bytes, of the INFO field. The length field is not used by the Cluster Hardware.

FRAME CHECK SEQUENCE FIELD

A cyclic redundancy check (CRC) is used to generate a CRC value for the FCS field (90). The FCS is 32-bits and is generated over the DA, SA, L, and INFO fields. The CRC is identical to the one used in the 802.3 standard.

MAXIMUM MESSAGE LENGTH

Two maximum message lengths are enforced. The IEEE 802.3 standard has a maximum message length of 1.5 K bytes, while Cluster will handle up to 4.5 K bytes. Native Cluster nodes (those with a Node Controller) have only Local addresses. Universal addresses are reserved for 802.3 nodes and imply that only 1.5 K byte messages may be sent to these nodes.

Group messages are be restricted to 1.5 K bytes to enforce compatibility with 802.3 nodes. The smaller group message size also allows the use of a more efficient broadcast mechanism in the Cluster. Consequently, native Cluster group messages are restricted to 1.5 K bytes.

CLUSTER ADDRESS STRUCTURE

FIGS. 7a and 7b show the structure of the Local address field for a native Cluster node address. Both group (FIG. 7a) and individual address (FIG. 7b) structures are illustrated. The I/G field (120, 130) is the Individual or Group Address (1 bit). The CMMI field is the Cluster Management Message Identifier (6 bits). A 24 bit field is reserved. The HID field is the Hub Identifier (8 bits). The LID filed is the Link Identifier (8 bits). The GID field is the Group Identifier (16 bits).

LOCAL ADDRESS FORMAT

The CMMI field is a Cluster defined field used to identify network control functions. A zero value in the field indicates that the message is to be handled normally. A nonzero value identifies a special function to be performed by the CLIC selected by the HID and LID field.

Cluster Management Messages (CMMs) are addressed directly to a Ring Controller and are used to manage functions in the network that cannot be directly handled by the hardware. Examples are network mapping, initialization of routing functions, diagnostic evaluation, and performance monitoring. Ring Controllers recognize the message as a CMM and treat it as a normal message unless it is addressed to them. If addressed to the Ring Controller, the function defined by the CMMI field are performed. CMMs are described more fully in U.S. Pat. No. 4,939,724.

All Cluster Hubs are given a unique Hub Identifier at initialization. All links attached to the hub are also assigned a unique identifier relative to the hub they are attached. Up to 256 hubs, and 256 links per each hub, can be supported in a single Cluster network. A native Cluster node connected to a link takes on the address of the hub and link to which it is attached. 802.3 nodes may use either the Local address or a Universal address.

The Group Identifier (GID) provides for multi-cast addressing. Local group addressing is not supported by Cluster hardware, deferring the interpretation to the node itself. All messages addressed to a group are broadcast to all nodes, where they can filter the address.

NODE INTERFACE

Two methods of interfacing a node to the Cluster are provided. The IEEE Standard 802.3 compatible link interface allows an unmodified 802.3 node to be directly attached to a Cluster through one of several different available 802.3 media choices. High performance nodes use the Node Controller (CLIC) which is described in copending application Ser. No. 07/291,640. The Node Controller (CLIC) provides for high bandwidth links and supports low latency protocols.

IEEE 802.3 LINK INTERFACE

Two basic operational modes are incorporated in the CLIC shown in FIG. 2, the Node Controller mode and the Ring Controller mode. A common block of logic, including the FIFO buffers (32, 34), output link interface (36) and input link interface (37), are shared by two independent logic blocks (40, 42) that implement the operational modes. When the Node Controller interface logic (40) is selected, the internal interface (44) is dedicated to it, along with the I/O Interface pins (46), and the Ring Controller hub interface logic (42) is disabled. The I/O Interface pin functions and timing are determined by the mode selected.

The Node Controller provides a slave direct memory access (DMA) interface to a protocol processor responsible for controlling the Cluster connection. The slave DMA interface is capable of very high transfer rates and incorporates additional functionality to support low-latency protocol development. The interface is optimized for use with a protocol processor/high performance DMA controller combination, such as an Intel 80386 with an Intel 82380 DMA controller, an Intel 80960CA with integrated DMA, or a Channel Processor (64). Two Cluster controller subsystems are illustrated in FIGS. 3 and 4.

As shown in FIG. 3, a microprocessor is coupled with memory, the Node Controller, and a system bus interface. This is a high performance subsystem for use in a department computer or mainframe. The local memory is used for the protocol processor code and variables, with the actual messages transferred between system memory and the Node Controller. The combination of large FIFO buffers and the low latency protocol support, makes this model practical, and avoiding extra copies.

NODE CONTROLLER SUBSYSTEM CONTROLLER

The following sequence describes the general model for message reception and transfer to system memory:

1. As the header of an incoming message is received, it is transferred to local memory (54).
2. Once the header has been transferred, the Node Controller interrupts the protocol processor (56).
3. The processor (56) acknowledges the interrupt and examines the header.
4. While the protocol processor examines the header, the remainder of the message is stored in the Node Controller Input FIFO (34), but is not transferred to the subsystem or memory.
5. Once the disposition of the message has been determined, the remainder of the message is transferred to the destination buffer in system memory (54).
6. A final interrupt is generated, indicating the availability of a status message, after the complete message has been transferred.

7. The processor acknowledges the interrupt and reads the status register.

8. The transfer is then completed based on the status received.

The above sequence allows processing of the message header to be overlapped with the receipt of the message. In many systems, the transfer to system memory is faster than the transfer rate of incoming messages. The time spent in processing the header at the beginning is gained back in the transfer of the message. Copying the message into a local buffer is unnecessary due to the large buffer in the Node Controller and the flow control on the link to the hub.

ALIGNMENT OF MESSAGE BUFFERS

Messages provided by a system for transmission on a network can begin on any byte boundary within system memory and be any number of bytes long within the maximum and minimum size boundaries. The message can also be composed of multiple buffers chained together with each buffer having different lengths and beginning on different boundaries. The Node Controller is designed as a 32-bit device to achieve high transfer rates with minimum impact on system bandwidth.

The Node Controller does not provide for data alignment, leaving that task to the protocol processor and/or DMA controller. Available DMA controllers provide alignment and assembly/disassembly capabilities that eliminate the need for providing them in the Node Controller.

The Node Controller expects all messages to be transferred as contiguous words (32-bits wide) starting with the first four bytes to be transferred. Messages less than an integral number of words long are designated in the control word initiating the message transfer. The last word of the message transferred to the Node Controller is truncated based on the length provided in the control word.

Input messages for the system are handled in a similar fashion. The status word provided at the end of the transfer into memory indicates the number of valid bytes in the last word of the message.

The 16-bit bus mode also operates in the same way, except everything is an integral number of half-words instead of full words.

MEMORY-MAPPED CONTROL/STATUS INTERFACE

As described in the above-identified application Ser. No. 07/291,640, the Node Controller mode of the CLIC shown in FIG. 1 is selected through an I/O pin (43) at component reset/initialization. The Node Controller mode configures the I/O pins (44, 45) as a local bus for interfacing to a node. This interface (40) consists of a set of memory-mapped registers that control the operation of the Node Controller.

INTERRUPTS

Interrupts are provided to notify the protocol processor when various events, such as a message has arrived, an error occurred, or output data is required. Formatting and masking options are provided for handling the various interrupts. One or two interrupt lines can be used, with the input and output channels sharing a single line or each using a separate line. The default mode is a single interrupt.

MESSAGE TRANSFER ON NODE CONTROLLER I/O BUS

Messages are transferred from the protocol processor to the Node Controller as a contiguous string of words. The protocol processor or DMA device is responsible for manipulating the transfer of the message such that there are no breaks in it. Messages that are less than an integral number of words in length are handled through the control/status registers. Message length is transferred when initiating output and is used to determine the actual number of bytes transmitted on the link. If it is less than an integral number of words, the last word (or half-word) transferred on I/O bus is truncated in the Node Controller.

On input, a full word containing the last byte(s) of the message is transferred to the subsystem. An input status register indicates the number of valid bytes in the last word.

All data alignment, assembly and disassembly of messages is the responsibility of the protocol processor/DMA controller pair. The only support provided by the Node Controller is the specification of actual message length on output initiation and reporting of the number of bytes in the last word of an input transfer status. The slave DMA interface utilizes two sets of DMA request/acknowledge signals, one for input and one for output. The DMA request signal from the Node Controller indicates that a data transfer is desired, the acknowledge from the DMA controller that it is granted. The timing of the actual transfer is controlled by write/read signals from the DMA controller and a ready signal from the Node Controller. The input and output logic is totally independent, allowing full duplex operation. All data transfers to or from the Node Controller are two clock transfers, once DMA acknowledge has been received. Pipelined transfers are supported.

I/O BUS SIGNALLING

The Node Controller I/O bus is more fully described in the above-referenced copending patent application Ser. No. 07/291,640.

NETWORK TOPOLOGY AND ROUTING

The interconnection topology of Cluster Hubs is determined by the application and supported by network wide routing logic. Hubs are connected to other hubs by a duplex link attached to a Ring Controller in each Hub. Cluster Hubs may be interconnected in any configuration up to the limit of 256 hubs per network and 256 links per hub. Each link used for interconnecting two hubs reduces the number of nodes that can be attached to that hub. The native Cluster addressing assigns each Ring Controller a unique address based on the 8-bit Hub ID and 8-bit Link ID. A node attached to a Ring Controller takes on the address of the Ring Controller to which it is addressed.

Two routing mechanisms are supported: one for node-to-node communication, and one for broadcast (a single node to all nodes). Node-to-node communication utilizes the Hub ID for routing across the network. Broadcast messages depend on the Broadcast Tree, which is a spanning tree that encompasses the complete network. The Broadcast Tree encompasses only those hub-to-hub links required for full connectivity.

NODE TO NODE ROUTING THROUGH THE NETWORK

The Cluster Network Header provides a common message header that is used by the Cluster for routing messages. The Control field identifies the type of transaction being performed, while the Propagation Counter prevents corrupted messages from looping endlessly. The destination address is a native Cluster address, which uses the unique addresses assigned during hub initialization. These addresses have network topological significance and are used by the node to node routing mechanism. The header is appended to the beginning of all messages by the Cluster and removed before the message is given to the destination.

UNIVERSAL DESTINATION ADDRESSES

The previously defined mechanism for transferring messages with destination addresses in the Individual, Universal 802.3 format is limited to transfers between source and destination nodes attached to the same hub and cannot be applied to multiple hub networks. The Universal address must be "translated" to a native address, which is then placed in the destination address field of the Cluster Network Header. The message is then routed through the network using the standard Cluster routing mechanisms. The address translation provided by the Ring Controller is described in copending application Ser. No. 07/291,640.

LINK IDENTIFICATION

After Reset, a Ring Controller is unaware of whether it is attached to another Ring Controller (in the ring hub) or to a Node Controller. (802.3 node connections are identified by a mode pin due to their special handling.) A simple search using the Link Header is made to identify whether a ring controller or a node controller exists at the other end. The results are used in enabling the recognizers on the Ring Bus for the Ring Controllers.

HUB-TO-HUB ROUTING ALGORITHM

As described in copending application Ser. No. 07/291,640, messages are transferred between Ring Controllers attached to the same Hub by first establishing the connection with a Transfer Request packet. The message is then transferred in multiple data packets, with the destination controlling the flow by use of the Send Packet Reply packet transmitted to the source.

The destination Ring Controller establishes the connection upon recognition of its address in the Transfer Request packet. Two recognition mechanisms are provided: one for node-to-node connections and one for hub-to-hub connections. The Ring Controller node recognizer looks for its own address (both Hub ID and Link ID), while the hub-to-hub recognizer looks only for programmed Hub IDs other than its own. The hub-to-hub recognizers are disabled after Reset and must be programed by the Network Manager before multi-hub routing can be enabled. Several recognizers are provided, each one capable of passing a contiguous range of Hub IDs or a single ID. Once the Hub ID is recognized as within the Ring Controllers range, the Transfer Request is acknowledged by asserting the Packet Ack signal for the packet.

ROUTING RULES

The following rules are enforced by the Cluster in hub-to-hub routing: The source of a message on a hub will not accept that message for transmission on its own link. This prevents a message from looping endlessly between two hubs.

A Ring Controller ignores a Transfer Request packet that has already had its Packet Ack asserted. If there are multiple recognizers set to the same Hub ID, only the first one downstream of the source handles it.

A Ring Controller does not pass a message that has the same Hub ID a itself to another hub.

PROPAGATION LIMITER

The Cluster Network Header described in copending application Ser. No. 07/291,640 has an 8-bit field defined as the Propagation Counter. It is initially set to all 1's or a value of 255, and decremented each time the message, to which it is appended, traverses a hub. Once it reaches a value of zero, the message is discarded by the next hub that receives it. The Propagation Counter prevents messages from circulating endlessly through the network. It allows the message to be propagated through the maximum number of hubs allowed in a network before the message is discarded. Corruption of the address or misprogramming of the recognizers will not lock up the network.

RECOGNIZER INITIALIZATION

Determining the values to be used in the recognizers is a network management function. The flexibility of the configuration requires more intelligence than is provided in the Cluster hardware. While the policy is determined by the network manager, the Cluster does provide support for mapping the topology of the network and programing the recognizers. The Cluster Management Messages (CMM) allow the Network Manager to directly access or change information in the Ring Controllers, as described in U.S. Pat. No. 4,939,724.

BROADCAST MESSAGES

Group or broadcast messages are identified in the Control Field of the Cluster Network Header. Cluster handles group and broadcast messages identically, consequently they are referred to as broadcast messages for convenience. All broadcast messages are transmitted to all nodes on the network. The Broadcast Tree is an independent mechanism that identifies the routing between hubs for all broadcast messages. It is a spanning tree that guarantees that each hub receives the broadcast message only once. Links are identified as belonging to the Broadcast Tree by an enabling flag.

A broadcast message is received by all Ring Controllers on the hub. Those Ring Controllers attached to a node will pass the message on to the node. Those Ring Controllers attached to another hub pass it on only if they have the "Broadcast Enable mode" asserted. If they do not, the Ring Controller discards the message. The same process is repeated in each additional hub that the message reaches. The Ring Controller that receives the broadcast message from another hub transmits it on its own hub. All nodes attached to that hub receive it and any other Ring Controllers in the Broadcast Tree pass it on to their attached hubs.

The branches in the Broadcast Tree are the links, including both directions. That is, if two hubs are connected by a link that is identified as part of the Broadcast Tree, a broadcast sourced in one is transmitted over the designated link to the other. Likewise, a broadcast message sourced in the other one is transferred over the same link, only in the opposite direction. As in the node-to-node routing, the Ring Controller sourcing the message will not be capable of receiving it. This prevents inducing loops between hubs if the Tree is not properly programed.

PROPAGATION LIMITER

The Cluster Network Header is common to broadcast messages as well as individually addressed messages. The Propagation Counter provides the same function for broadcast messages as it does for individual messages, limiting the number of nodes that an individual message can traverse. The field is decremented on every transition from hub-to-hub by the Ring Controller receiving it. If the value is zero when it is received, it is discarded, stoping the propagation of that message.

BROADCAST TREE INITIALIZATION

The Broadcast Tree initialization is a function of the Network Manager. CMMs are also used for topology mapping and the setting of the Broadcast Enable Flag. The Broadcast Tree must include every Hub and ensure that there are no loops that would route the message through the same hub twice.

PERFORMANCE AND FLOW CONTROL

The Cluster architecture is designed to accommodate a wide variety of media transmission rates and multiple hub configurations in a single network. The latency of a message transmission between any two nodes is dependent on many factors.

While the invention has been particularly shown and described with reference to preferred embodiments thereof, it will be understood by those skilled in the art that the foregoing and other changes in form and detail may be made therein without departing from the scope of the invention.

What is claimed is:

1. A star local area network, comprising:
a ring bus hub (4);
said ring bus hub (4) being comprised of a plurality of ring controllers (10, 12, 14, 16) driven by a common clock source (7), each ring controller being connected by means of a ring bus (20, 22, 24, 26) to other ring controllers in series to form a closed ring;
a plurality of nodes (3, 5, 9) including processor means (2, 30, 31) for creating messages for transfer on said network;
each one of said nodes including node controller means, and
a plurality of duplex communication links (18, 19, 21, 28);
each one (3) of said plurality of nodes being geographically distant from said hub (4) and each one of said node controller means within a node being connected to a corresponding one (10) of said ring controllers by means of one (18, 19) of said duplex communication links;
each of said node controllers including node interface means (40) for transmitting said messages as a contiguous stream of words on said duplex communication link;

each of said ring controllers including ring bus interface means (42) for forming said messages into discrete data packets for insertion onto said ring bus;
each one of said ring controllers including means (42) for buffering data packets and for inserting said data packets onto said ring bus;
one of said ring controllers (12) having ring monitor logic means for performing ring monitor functions to thereby designate said one ring controller as a ring monitor controller.

2. The combination in accordance with claim 1 wherein at least one of said plurality of duplex communication links (18, 19, 21, 28) includes:
an input data link (36);
an output data link (37);
an output buffer (32) connected to said input data link; and,
an input buffer (34) connected to said output data link;
said input and output data links including means connected to said input buffer and to said output buffer for controlling data flow between said duplex communication link and said input buffer (34) and said output buffer (32).

3. The combination in accordance with claim 1 wherein at least one of said plurality of ring controllers (10, 12, 14, 16) includes:
a set of input pins (44);
a set of output pins (45);
a common logic connected to said ring bus interface logic (42);
said common logic including an output FIFO buffer (32) connected to an output link interface (36, 37),
said common logic including an input FIFO buffer (34) connected to an input link interface (38), and,
mode selection means (43) for selecting a ring controller mode of operation;
said ring bus interface means (42) being responsive to said selection means (43) for activating said pins (44, 46) with respect to said ring bus interface means (42).

4. The combination in accordance with claim 1 wherein at least one of said plurality of nodes (3, 5, 9) includes:
a set of input pins (44);
a set of output pins (45);
a common logic connected to said node interface logic (40);
said common logic including an output FIFO buffer (32) connected to an output link interface (36, 37),
said common logic including an input FIFO buffer (34) connected to an input link interface (38), and,
mode selection means (43) for selecting a node controller mode of·operation;
said node interface means (40) being responsive to said selection means (43) for activating said pins (44, 46) with respect to said node interface means (40).

5. The combination in accordance with claim 2 wherein at least one of said plurality of ring controllers (10, 12, 14, 16) includes:
a set of input pins (44);
a set of output pins (45);
a common logic connected to said ring bus interface logic (42);
said common logic including an output FIFO buffer (32) connected to an output link interface (36, 37), said common logic including an input FIFO buffer (34) connected to an input link interface (38), and, mode selection means (43) for selecting a ring controller mode of operation;

said ring bus interface means (42) being responsive to said selection means (43) for activating said pins (44, 46) with respect to said ring bus interface means (42).

6. The combination in accordance with claim 2 wherein at least one of said plurality of node controller means includes:

a set of input pins (44);

a set of output pins (45);

a common logic connected to said node interface logic (40);

said common logic including an output FIFO buffer (32) connected to an output link interface (36, 37), said common logic including an input FIFO buffer (34) connected to an input link interface (38), and, mode selection means (43) for selecting a node controller mode of operation;

said node interface means (40) being responsive to said selection means (43) for activating said pins (44, 46) with respect to said node interface means (40.

7. The combination in accordance with claim 3 wherein at least one of said plurality of duplex communication links (18, 19, 21, 28) includes:

an input data link (36);

an output data link (37);

an output buffer (32) connected to said input data link; and, an input buffer (34) connected to said output data link;

said input and output data links including means connected to said input buffer and to said output buffer for controlling data flow between said duplex communication link and said input buffer (34) and said output buffer (32).

8. The combination in accordance with claim 7 wherein at least one of said plurality of node controller means includes:

a set of input pins (44);

a set of output pins (45);

a common logic connected to said node interface logic (40);

said common logic including an output FIFO buffer (32) connected to an output link interface (36, 37), said common logic including an input FIFO buffer (34) connected to an input link interface (38), and, mode selection means (43) for selecting a node controller mode of operation;

said node interface means (40) being responsive to said selection means (43) for activating said pins (44, 46) with respect to said node interface means (40).

9. The combination in accordance with claim 8 wherein at least one of said plurality of duplex communication links (18, 19, 21, 28) includes:

an input data link (36);

an output data link (37);

an output buffer (32) connected to said input data link; and, an input buffer (34) connected to said output data link;

said input and output data links including means connected to said input buffer and to said output buffer for controlling data flow between said duplex communication link and said input buffer (34) and said output buffer (32).

10. The combination in accordance with claim 4 wherein at least one of said plurality of ring controllers (10, 12, 14, 16) includes:

a set of input pins (44);

a set of output pins (45);

a common logic connected to said ring bus interface logic (42);

said common logic including an output FIFO buffer (32) connected to an output link interface (36, 37), said common logic including an input FIFO buffer (34) connected to an input link interface (38), and, mode selection means (43) for selecting a ring controller mode of operation;

said ring bus interface means (42) being responsive to said selection means (43) for activating said pins (44, 46) with respect to said ring bus interface means (42).

* * * * *